(12) United States Patent
Hemphill et al.

(10) Patent No.: US 8,056,689 B2
(45) Date of Patent: Nov. 15, 2011

(54) WATER PUMP DISCONNECT CLUTCH

(75) Inventors: Jeffrey Hemphill, Copley, OH (US); Mavinkal Jayaram, Broadview Heights, OH (US); Scott Hart, Sharon, SC (US)

(73) Assignee: Schaeffler KG, Herzogenaurach (DE)

( * ) Notice: Subject to any disclaimer, the term of this patent is extended or adjusted under 35 U.S.C. 154(b) by 762 days.

(21) Appl. No.: 12/218,645

(22) Filed: Jul. 17, 2008

(65) Prior Publication Data

US 2009/0055027 A1 Feb. 26, 2009

Related U.S. Application Data

(60) Provisional application No. 60/959,903, filed on Jul. 17, 2007.

(51) Int. Cl.
*F16D 43/25* (2006.01)
*F16D 15/00* (2006.01)
(52) U.S. Cl. ............................. 192/38; 192/65; 192/82 T
(58) Field of Classification Search ..................... 192/38, 192/65, 82 T
See application file for complete search history.

(56) References Cited

U.S. PATENT DOCUMENTS

| 2,570,515 | A | | 10/1951 | Bonham | |
|---|---|---|---|---|---|
| 3,279,571 | A | * | 10/1966 | Wassilieff | 192/38 |
| 3,382,852 | A | * | 5/1968 | De Lorean | 417/223 |
| 3,430,519 | A | * | 3/1969 | Roper | 475/87 |
| 6,619,454 | B2 | | 9/2003 | Hayward | |
| 6,684,992 | B2 | * | 2/2004 | Goto et al. | 192/35 |
| 6,915,887 | B2 | | 7/2005 | Faller et al. | |

* cited by examiner

*Primary Examiner* — Richard M. Lorence
(74) *Attorney, Agent, or Firm* — Simpson & Simpson, PLLC

(57) ABSTRACT

A water pump disconnect clutch including: a first race having first and second portions with first and second diameters, respectively; a second race having at least one ramp; at least one rolling element disposed radially between the first and second races; and an engagement means for axially displacing the at least one rolling element. In response to an increase in temperature for the pump above a specified level, the engagement means is for axially displacing the at least one rolling element from a first position, in which the first and second races are rotationally independent, to a second position to rotationally lock the first and second races. In response to a decrease in temperature for the pump below the specified level, the engagement means is for axially displacing the at least one rolling element from the second position to the first position.

24 Claims, 5 Drawing Sheets

WATER PUMP DISCONNECT CLUTCH

CROSS-REFERENCE TO RELATED APPLICATIONS

This application claims the benefit under 35 U.S.C. §119 (e) of U.S. Provisional Application No. 60/959,903 filed on Jul. 17, 2007 which application is incorporated herein by reference.

FIELD OF THE INVENTION

The invention relates generally to means for coupling and uncoupling members rotatable relative to each other, and more specifically to a water pump disconnect clutch.

BACKGROUND OF THE INVENTION

It is desirable to disconnect unnecessary devices from an automobile engine when not needed to avoid parasitic drag. For instance, it is common to disconnect air conditioner compressors and cooling fans. Similarly, disconnection of an engine water pump when the engine is cool improves fuel economy and reduces the time necessary for the engine to reach optimal operating temperature.

It is known to use electrical devices to control water pumps. U.S. Pat. No. 6,915,887 describes an electromagnetic type clutch for disconnecting a water pump. At least one manufacturer is producing an electric driven water pump. However, use of electronic devices and controls introduces cost and complexity.

It is known to use thermostatic devices to couple and release relatively rotatable members. U.S. Pat. No. 2,570,515 describes a device for an automobile radiator fan in which jamming rollers with camming projections are engaged with a thermostat to couple and uncouple the driving and driven members. However, once engaged, it is difficult to disengage the jamming roller clutch by applying the minimal force from the thermostat to the projections.

U.S. Pat. No. 6,619,454 describes a disconnect device in which balls are held in place by a keeper that moves axially to release the balls and disconnect the drive. Such a device is designed to disconnect in the event of a malfunction. It is difficult to reconnect the input and output elements under load due to large contact angles and high friction.

Thus there is a long-felt need for a water pump disconnect clutch with low cost and complexity. There is also a need for a water pump disconnect clutch with low engagement friction that can be easily engaged and disengaged with a thermostatic device.

BRIEF SUMMARY OF THE INVENTION

The present invention broadly comprises a water pump disconnect clutch including: a first race; a second race having at least one ramp; at least one first rolling element disposed radially between the first and second races; and an engagement means for axially displacing the at least one first rolling element. In response to an increase in temperature for the pump above a specified level, the engagement means is for axially displacing the at least one first rolling element from a first position, in which the first and second races are rotationally independent, to a second position to rotationally lock the first and second races. In response to a decrease in temperature for the pump below the specified level, the engagement means is for axially displacing the at least one first rolling element from the second position to the first position.

In one embodiment, the first race is disposed radially inward from the second race. In another embodiment, the first race is disposed radially outward from the second race. In a further embodiment, the engagement means is a snap disc thermostat.

In one embodiment, the first race includes first and second portions with first and second diameters, respectively, and, in the second position, the at least one rolling element is in contact with the second portion. In another embodiment, the first diameter is less than the second diameter. In a further embodiment, the second diameter is less than the first diameter.

In one embodiment, each ramp in the at least one ramp includes first and second portions with first and second diameters, respectively, and, in the second position, the at least one rolling element is in contact with the second portion. In another embodiment, the first diameter is less than the second diameter. In a further embodiment, the second diameter is less than the first diameter.

In one embodiment, the engagement means is for axially displacing the first or second race in an axial direction away from the at least one first rolling element in response to the temperature for the pump being below a specified level. In another embodiment, the engagement means is for axially displacing the first or second race in an axial direction toward the at least one first rolling element in response to the temperature for the pump being above a specified level. In a further embodiment, the clutch includes a cage, and the cage circumferentially positions the at least one first rolling element.

In one embodiment, the clutch includes a shaft and the engagement means is axially retained by the shaft. In another embodiment, the first or second race is integral to the shaft. In a further embodiment, the clutch includes a third race arranged for connection to a water pump impeller and at least one second rolling element disposed in a channel formed between the first or second race and the third race. The at least one second rolling element is for rotationally locking the first, second and third races when the at least one first roller element is displaced from the first position to the second position. In yet another embodiment, the first or second races, or the third race is a stamped sheet metal component.

In one embodiment, the clutch includes means for transmitting a nominal torque from the shaft to the third race. In another embodiment, the means for transmitting a nominal torque is a spring in frictional engagement with the shaft and the third race.

The present invention also broadly comprises a method for operating a water pump disconnect clutch.

It is a general object of the present invention to provide a water pump disconnect clutch with low cost and complexity. If is a further object of the present invention to provide a water pump disconnect clutch with low engagement friction that is easily engaged and disengaged with a thermostatic device.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

Fig. 1A is a partial end view of the water pump disconnect clutch shown in

FIG. 1;

DETAILED DESCRIPTION OF THE INVENTION

At the outset, it should be appreciated that like drawing numbers on different drawing views identify identical, or functionally similar, structural element of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 4A:
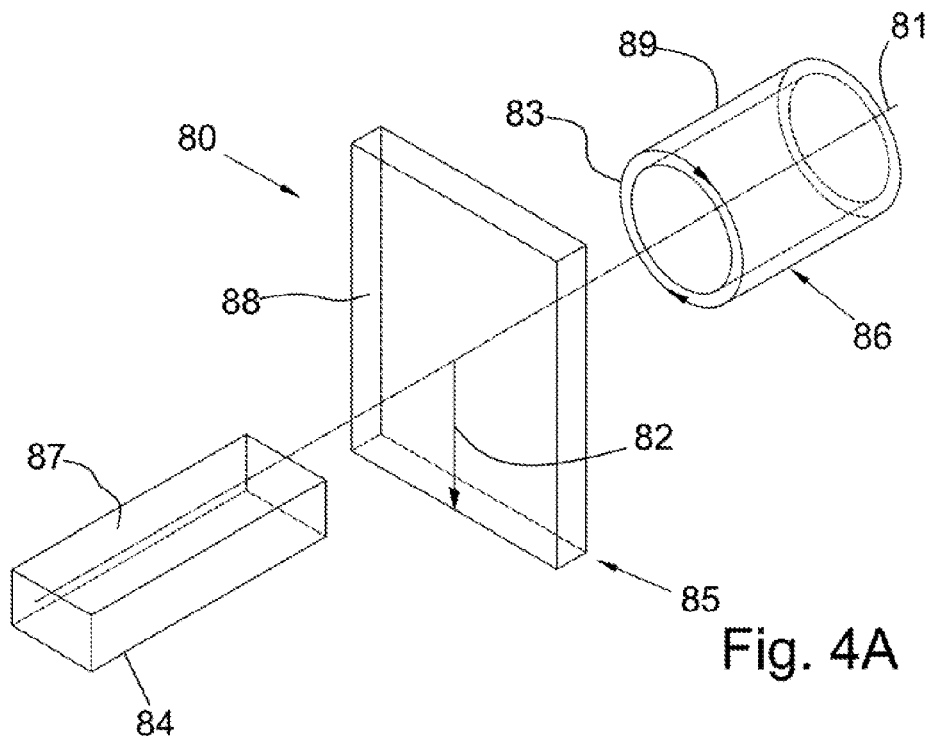
FIG. 4A is a perspective view of a cylindrical coordinate system demonstrating spatial terminology used in the present application.

FIG. 4A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 4B:
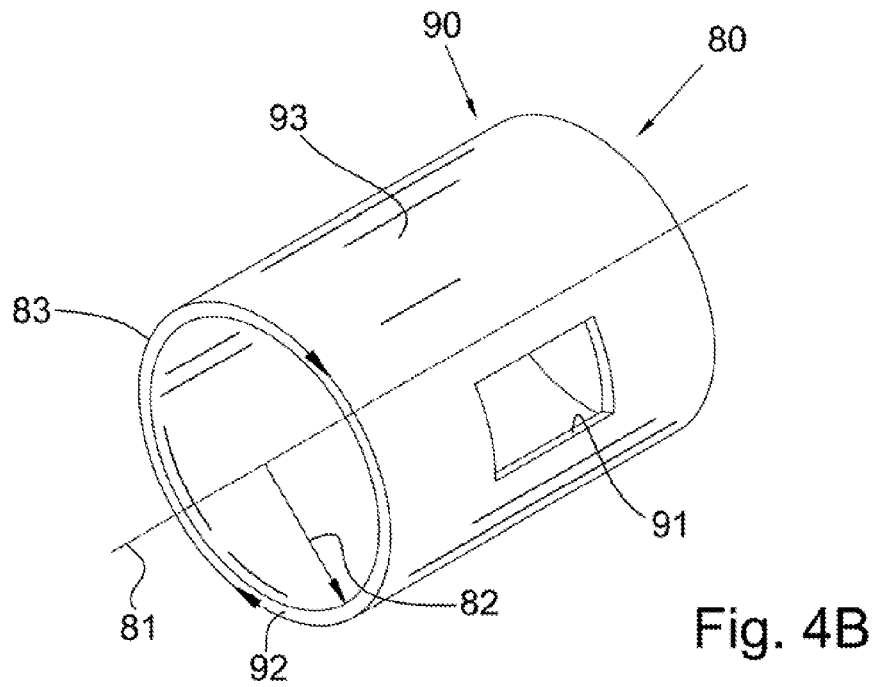
FIG. 4B is a perspective view of an object in the cylindrical coordinate system of FIG. 4A demonstrating spatial terminology used in the present application; and, FIG. 5 is a partial cross-sectional view of a present invention water pump disconnect clutch.

FIG. 4B is a perspective view of object 90 in cylindrical coordinate system 80 of FIG. 4A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 1:
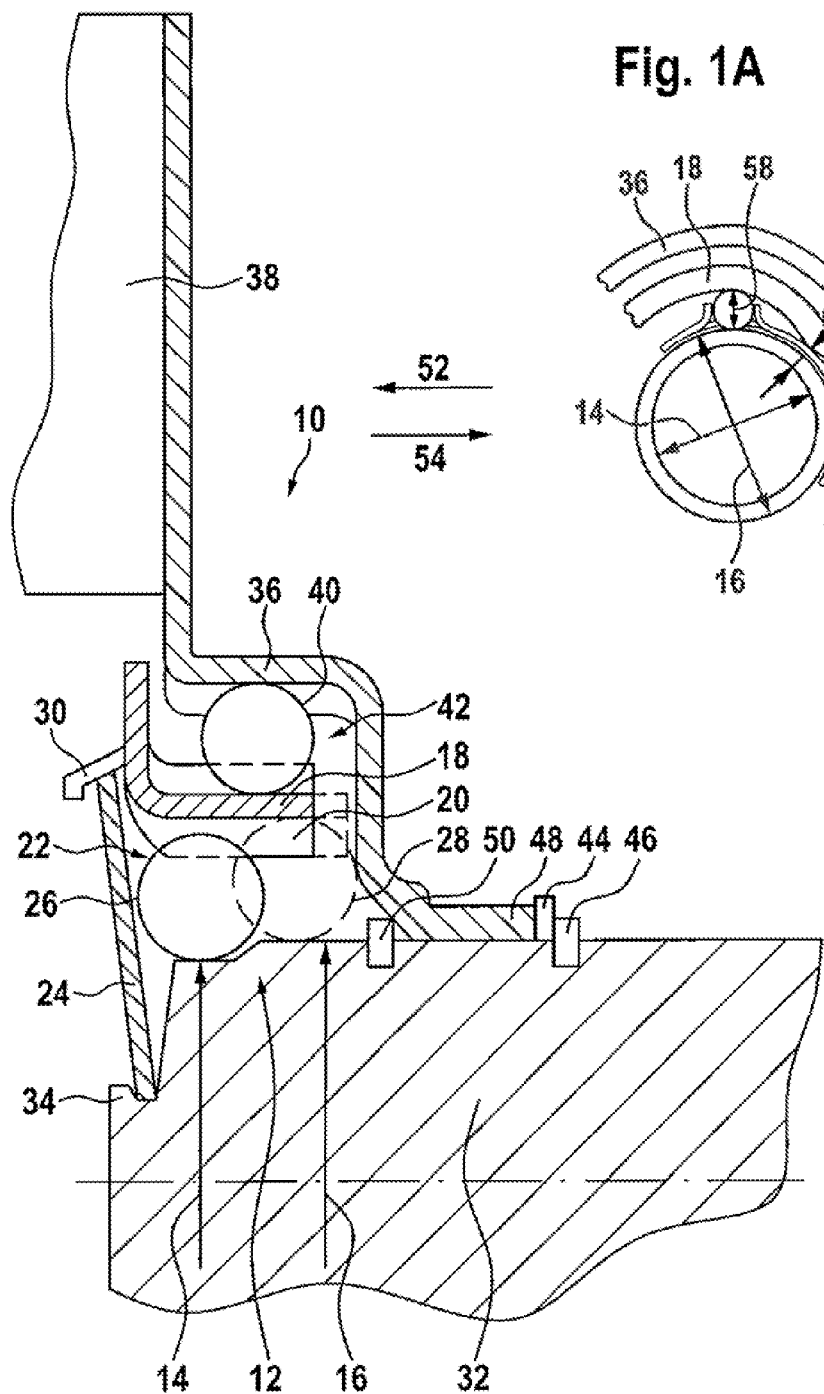
FIG. 1 is a partial cross-sectional view of a present invention water pump disconnect clutch.

FIG. 1 is a top half of a cross-sectional view of present invention water pump disconnect clutch 10. Clutch 10 includes race 12 having diameters 14 and 16 and race 18 having ramps 20 arranged in a circumferential direction, that is, the ramps slope in the circumferential direction. The clutch also includes at least one rolling element 22 disposed radially between first race 12 and second race 18. In one embodiment, at least one rolling element 22 is a plurality of rolling elements. In another embodiment, rolling element 22 is a metallic ball. Engagement means 24 is arranged to axially displace rolling element 22 from position 26 proximate to diameter 14 to position 28 (shown in dashed lines) in contact with diameter 16 to engage clutch 10, as further described infra.

Figure 5:
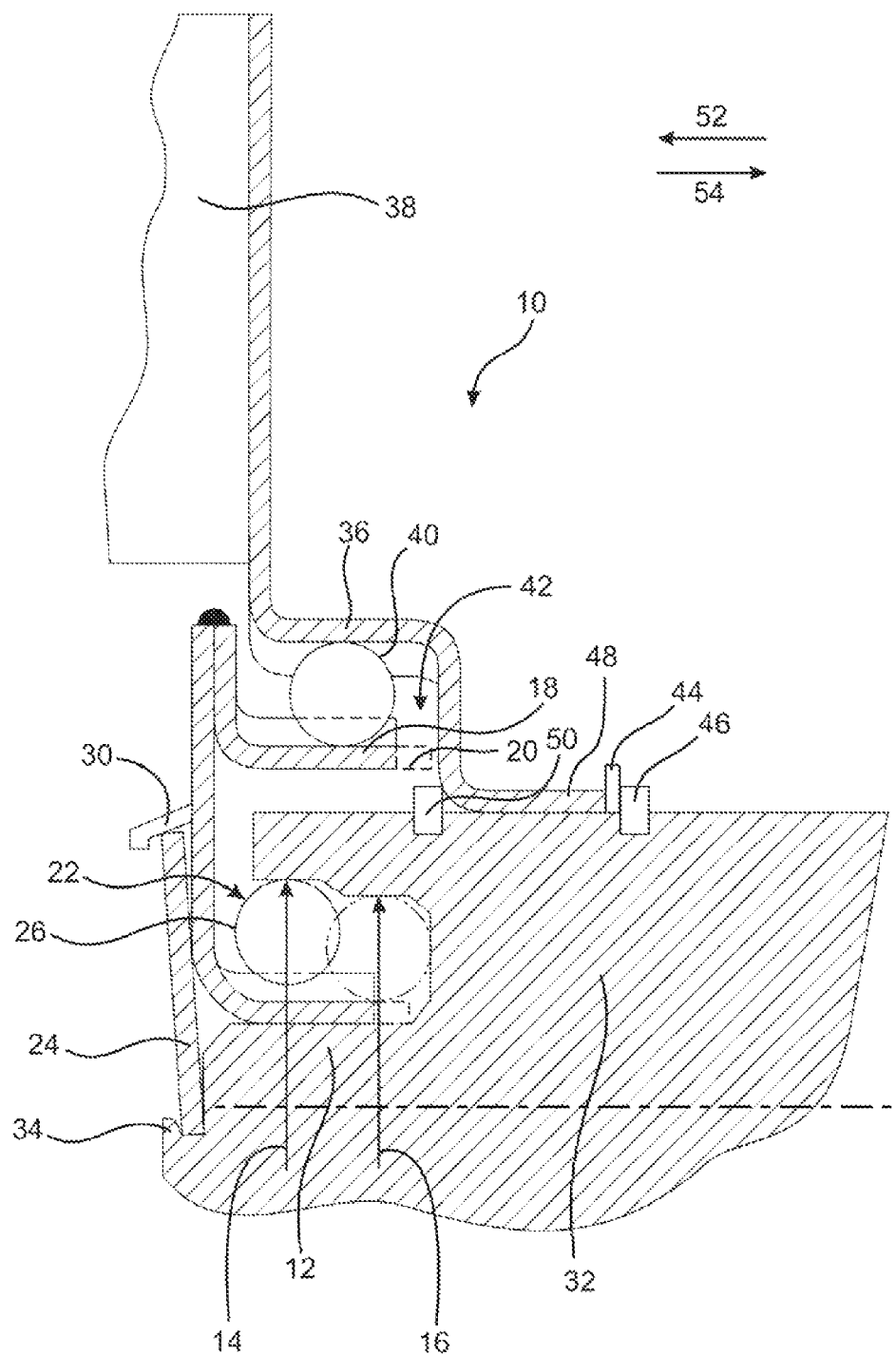

FIG. 5 is a top half of a cross-sectional view of present invention water pump disconnect clutch 10. In one embodiment, diameter 16 is less than diameter 14 and race 12 is located radially outside rolling element 22 and race 18, with ramps 20, is located radially inside rolling element 22.

In one embodiment, engagement means 24 is a snap disc thermostat. It should be understood that other engagement means, for exampling, including but not limited to engine vacuum, engine oil, or electrical engagement are within the spirit and scope of the claimed invention. In another embodiment, an outer circumference of engagement means 24 is retained in direction 52 by protrusion 30. As further described infra, means 24, in particular the outer circumference, axially displaces second race 18 in direction 54 to move element 22 from position 26 to position 28 to rotationally lock elements 22 and both races. By rotationally locked, we means that the elements and races are all forced to rotate together. In a further embodiment (not shown), a cage circumferentially positions rolling elements 22.

In one embodiment, shaft 32 is driven by an engine (not shown). For example, a pulley (not shown) driven by an engine belt (not shown) can be attached to shaft 32. Bearings (not shown) support shaft 32. Inner circumference of means 24 is axially restrained in direction by any means known in the art. In one embodiment, pinched area 34 of shaft 32 axially retains engagement means 24 such that axial displacement of the outer circumference of means 24 moves rolling element 22 between portions of race 12. In some aspects, race 12 is integral to shaft 32. Although pinched area 34 is shown, other methods i.e., staking, welding, snap-fit, bolting, riveting, could be used to retain means 24 on shaft 32.

FIG. 1A is a partial end view of clutch 10 viewed in direction 54. The following should be viewed in light of FIGS. 1 and 1A. In one embodiment, clutch 10 includes race 36 arranged to be connected to water pump impeller 38 and at least one rolling element 40 disposed in channel 42 formed between race 18 and race 36. In another embodiment, at least one rolling element 40 is a plurality of rolling elements. Elements 40 are rotationally locked with races 18 and 36 by being disposed in respective indents in races 18 and 36 as shown in FIG. 1A. Therefore, races 18 and 36 are rotationally locked via elements 40. However, elements 40 are able to spin/roll in an axial direction; therefore, race 18 is able to axially displace along the interface with elements 40. Thus, rolling element 40 advantageously transmits torque from race 18 to race 36 but still allows race 18 to move axially relative to race 36 with low friction, for example, to enable movement of elements 22 between positions 26 and 28. In one embodiment, the combination of race 18, race 36, and rolling element 40 is a ball spline arrangement. In another embodiment, one or both of race 18 and race 36 are stamped, sheet-metal components; however, it should be understood that race 18 and race 36 can be made from any material and manufacturing method known in the art.

In one embodiment, clutch 10 includes a means for transmitting a nominal torque from shaft 32 to impeller 38, for example, spring 44 in frictional engagement with snap ring 46 on shaft 32 and impeller housing 48. Snap ring 50 maintains an axial position of housing 48. Spring 44 reacts against ring 46 to create a frictional engagement of the housing, the spring, the ring, and the shaft; and spring 44 pushes housing 48 against ring 50 to create a frictional engagement of the housing, the spring, the ring, and the shaft. The frictional engagements of the housing and the shaft rotationally connect the housing and the shaft. Shaft 32 and impeller 38 are in slipping contact; that is, shaft 32 and impeller 38 rotate, but at different speeds, when clutch 10 is disengaged. Rotation of impeller 38 advantageously propels a minimal amount of fluid through the engine (not shown).

The method of operation of clutch 10 is now described. FIG. 1 shows clutch 10 in an initially disengaged state (position 26). Engagement means 24 is arranged such that contact with protrusion 30 urges race 18 in direction 52. Rolling element 22 is proximate the portion of race 12 with diameter 14. That is, rolling element 22 is at least partially radially aligned with the portion of race 12 with diameter 14. In the disengaged state, rolling element 22 does not contact race 12 due to rotational forces pulling element 22 radially outward, advantageously reducing friction. Alternately stated, races 12 and 18 are rotationally independent, that is, each race is free to rotate independent of the rotation of the other race. Frictional contact propels fluid in the disengaged state, as described supra.

When the cooling fluid reaches a predetermined temperature, outer diameter of engagement means 24 moves in direction 54, displacing rolling element 22 and race 18 in direction 54. In one embodiment, in which means 24 is a bimetallic snap disc thermostat, the motion of means 24 in direction 54 is a snap through motion of the bimetallic snap disc thermostat. Rolling contact between rolling element 22 and races 12 and 18, and between rolling element 40 and races 18 and 36 advantageously reduces friction associated with motion of race 18. As element 22 is moved in direction 54, element 22 is moved into contact with the portion of race 12 with diameter 16. Radially outward motion of element 22 moves element 22 into contact with race 18. As element 22 wedges against ramps 20 of race 18, races 12 and 18 are rotationally locked, and elements 22 transmit torque from race 12 to race 18, thereby engaging clutch 10.

When the cooling fluid temperature is reduced to a specified level, the outer diameter of engagement means 24 moves in direction 52, displacing race 18 in direction 52. Rolling element 22 is rolled in direction 52 by contact with race 18. When element 22 reaches the portion of race 12 with diameter 14, clutch 10 disengages. Rolling contact between rolling element 22 and races 12 and 18, and between rolling element 40 and races 18 and 36 advantageously reduces friction associated with motion of race 18.

Distance 56 between portion of race 12 with diameter 14 and race 18 is slightly larger than diameter 58 of rolling element 22. This differential ensures that rolling element 22 does not transmit torque when in position 26. When rolling element 22 contacts race 12 in position 28, element 22 contacts ramp 20 of race 18, initiating a wedging action between element 22 and races 12 and 18, creating a torque transfer path from race 12 through element 22 to race 18.

In one embodiment (not shown), each ramp in the at least one ramp includes first and second portions with first and second diameters, respectively. That is, instead of race 12 having portions with two different diameters, the ramps on race 18 have respective portions with two different diameters. In this embodiment, the operation of clutch 10 is substantially as discussed above. For example, in the disengaged position for the clutch, the at least one rolling element is radially aligned with the first portion, and in the engaged position for the clutch, the at least one rolling element is in contact with the second portion. Also, race 18 is displaced by element 24 as described supra to operate the clutch between the engaged and disengaged positions. In another embodiment, the first diameter is less than the second diameter. In a further embodiment, the second diameter is less than the first diameter. Thus, the radius of the ramps varies not only in the circumferential direction, for example, as for the ramps described for FIG. 1, but also in the axial direction. Alternately stated, the radial displacement of rolling element 22 by portions of race 12 having diameters 14 and 16, respectively, discussed supra, is replaced by a radial displacement of the rolling element due to movement along axially and radially varying portions of the ramp such that the radially inward race, for example, race 12, need not have varying diameters, for example, as described for race 12 in FIG. 1. Thus, the radial differential provided by race 12 in FIG. 1 is provided by the ramps in the embodiment under discussion.

Figure 2:
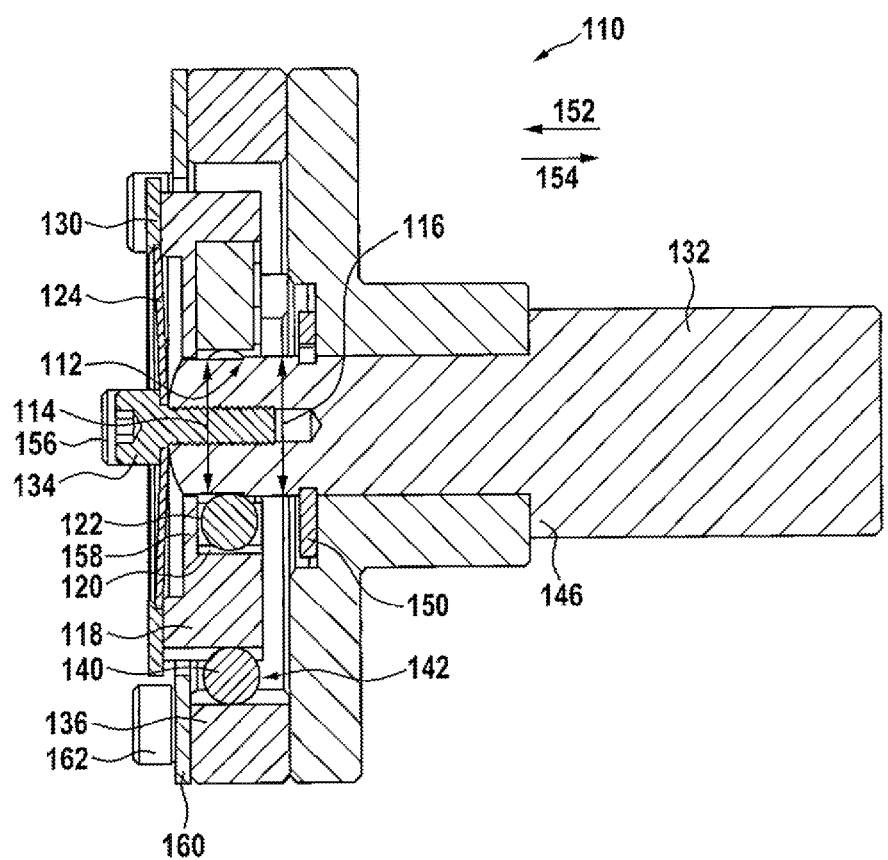
FIG. 2 is a partial cross-sectional view of a present invention water pump disconnect clutch.
Figure 3:
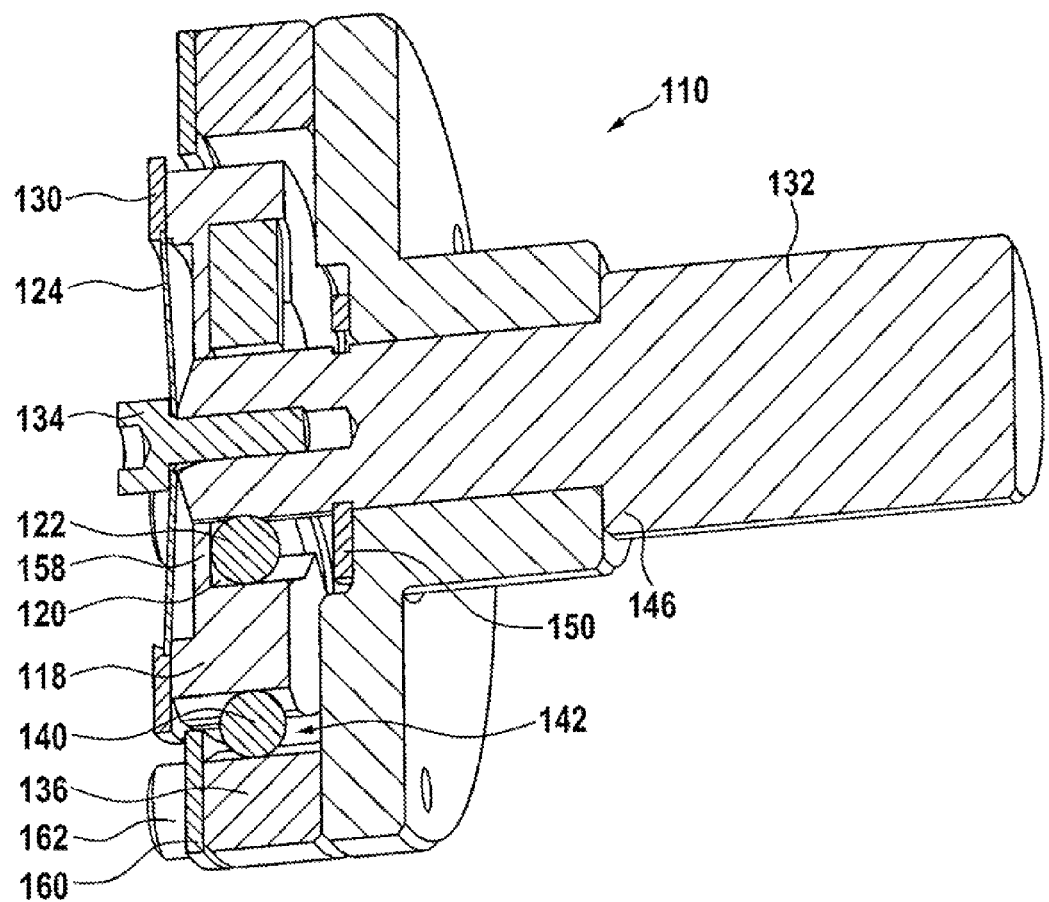
FIG. 3 is a perspective sectioned view of the water pump disconnect clutch shown in FIG. 2.

FIG. 2 is a cross-sectional view of present invention water pump disconnect clutch 110. FIG. 3 is a perspective sectioned view of water pump disconnect clutch 110 shown in FIG. 2. The following should be viewed in light of FIGS. 2 and 3. Clutch 110 includes race 112 having diameter 114 and diameter 116; race 118 having ramps 120 arranged in a circumferential direction, for example, similar to the arrangement for ramps 20 described in FIG. 1; and at least one rolling element 122 disposed radially between race 112 and race 118. Engagement means 124 is arranged to axially displace rolling element 122 from a first position proximate to a portion of race 112 with diameter 114 to a position (not shown) in contact with a portion of the race with diameter 116 to engage clutch 110. In one embodiment (not shown), diameter 116 is less than diameter 114 and race 112 is located radially outside rolling element 122 and race 118, with ramps 120, is located radially inside rolling element 122.

In one embodiment, engagement means 124 is a snap disc thermostat. It should be understood that other engagement means, for exampling, including but not limited to engine vacuum, engine oil, or electrical engagement are within the spirit and scope of the claimed invention. In another embodiment, engagement means 124 is positioned by plate 130 and fastener 156 to be axially adjacent race 118. In a further embodiment, engagement means 124 axially displaces race 118. In yet another embodiment cage 57 circumferentially positions a plurality of rolling elements 22.

In one embodiment, shaft 132 is driven by an engine (not shown). For example, a pulley (not shown) driven by an engine belt (not shown) can be attached to shaft 132. Bearings (not shown) support shaft 132 in the engine. In another embodiment, fastener 134, threaded into shaft 132, axially retains an inner circumference of engagement means 124 such that axial displacement of the outer circumference of means 124 moves rolling element 122 between portions of race 112. In a further embodiment, race 112 is integral to shaft 132. Although fastener 134 is shown, other methods i.e., staking, welding, snap-fit, riveting, could be used to retain means 124 on shaft 132.

Clutch 110 also includes race 136 arranged to be connected to a water pump impeller (not shown) and rolling element 140 disposed in channel 142 formed between race 118 and race 136. The discussion of rolling element 40 in the description of FIGS. 1 and 1A is applicable to rolling element 140. Thus, rolling element 140 advantageously transmits torque from race 118 to race 136 but still allows race 118 to move axially relative to race 136 with low friction. In one embodiment, the combination of race 118, race 136, and rolling element 140 is a ball spline arrangement. In another embodiment, one or both of race 118 and race 136 are stamped, sheet-metal components; however, it should be understood that race 118 and race 136 can be made from any material and manufacturing method known in the art.

Clutch 110 is axially positioned on shaft 132 by radial surface 146 and snap ring 150. Axial travel of rolling element 122 is limited by flanged portion 158 of race 118. Axial travel of rolling element 140 is limited by plate 160 attached to race 136 by fastener 162. Operation of clutch 110 is as described for clutch 10.

The following should be viewed in light of FIGS. 1 through 3. The following describes a present invention method for operating a water pump disconnect clutch. Although the method is presented as a sequence of steps for clarity, no order should be inferred from the sequence unless explicitly stated. A first step, in response to a temperature of the water pump rising above a specified level, axially displaces at least one first rolling element, radially disposed between first and second races; a second step rotationally locks the at least one first rolling element with the first and second races; and a third step, in response to the temperature of the water pump falling below the specified level, axially displaces the at least one first rolling element to enable independent rotation of the first and second races. In one embodiment, axially displacing the at least one first rolling element includes using a snap disc thermostat to axially displace the at least one first rolling element.

In one embodiment, axially displacing the at least one first rolling element includes axially displacing the second race. In another embodiment, rotationally locking the at least one first rolling element with the first and second races includes jamming the at least one first roller element against at least one ramp disposed on the first or second race. In a further embodiment, in response to the temperature of the water pump rising above the specified level, axially displacing the at least one first rolling element includes axially displacing the second race along at least one second roller element radially disposed between the second race and a third race, arranged to attachment to an impeller for the pump, and a fourth step rotationally locks the first, second, and third races.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What we claim is:

1. A water pump disconnect clutch, comprising:
a first race;
a second race having at least one ramp;
at least one first rolling element disposed radially between the first and second races; and
an engagement means for axially displacing the at least one first rolling element, wherein, in response to an increase in temperature for a pump above a specified level, the engagement means is for axially displacing the at least one first rolling element from a first position, in which the first and second races are rotationally independent, to a second position to rotationally lock the first and second races and wherein, in response to a decrease in temperature for the pump below the specified level, the engagement means is for axially displacing the at least one first rolling element from the second position to the first position.

2. The water pump disconnect clutch as recited in claim 1 wherein the first race is disposed radially inward from the second race.

3. The water pump disconnect clutch as recited in claim 1 wherein the first race is disposed radially outward from the second race.

4. The water pump disconnect clutch as recited in claim 1 wherein the first race includes first and second portions with first and second diameters, respectively, and wherein, in the second position, the at least one rolling element is in contact with the second portion.

5. The water pump disconnect clutch as recited in claim 4 wherein the first diameter is less than the second diameter.

6. The water pump disconnect clutch as recited in claim 4 wherein the second diameter is less than the first diameter.

7. The water pump disconnect clutch as recited in claim 1 wherein each ramp in the at least one ramp includes first and second portions with first and second diameters, respectively, and wherein, in the second position, the at least one rolling element is in contact with the second portion.

8. The water pump disconnect clutch as recited in claim 7 wherein the first diameter is less than the second diameter.

9. The water pump disconnect clutch as recited in claim 7 wherein the second diameter is less than the first diameter.

10. The water pump disconnect clutch as recited in claim 1 wherein the engagement means is a snap disc thermostat.

11. The water pump disconnect clutch as recited in claim 1 wherein the engagement means is for axially displacing the first or second race in an axial direction away from the at least one first rolling element in response to the temperature for the pump being below a specified level.

12. The water pump disconnect clutch as recited in claim 1 wherein the engagement means is for axially displacing the first or second race in an axial direction toward the at least one first rolling element in response to the temperature for the pump being above a specified level.

13. The water pump disconnect clutch as recited in claim 1 further comprising a cage, wherein said cage circumferentially positions the at least one first rolling element.

14. The water pump disconnect clutch as recited in claim 1 further comprising a shaft and wherein the engagement means is axially retained by the shaft.

15. The water pump disconnect clutch as recited in claim 14 wherein the first or second race is integral to the shaft.

16. The water pump disconnect clutch as recited in claim 1 further comprising a third race arranged for connection to a water pump impeller and at least one second rolling element disposed in a channel formed between the first or second race and the third race and wherein the at least one second rolling element is for rotationally locking the first, second, and third races when the at least one first roller element is displaced from the first position to the second position.

17. The water pump disconnect clutch as recited in claim 16 wherein the first or second race, or the third race is a stamped sheet metal component.

18. The water pump disconnect clutch as recited in claim 16 further comprising a shaft and means for transmitting a nominal torque from the shaft to the third race.

19. The water pump disconnect clutch as recited in claim 16 further comprising a shaft and wherein the means for transmitting a nominal torque is a spring in frictional engagement with the shaft and the third race.

20. A method for operating a water pump disconnect clutch comprising:

in response to a temperature of a water pump rising above a specified level, axially displacing at least one first rolling element, radially disposed between first and second races;

rotationally locking the at least one first rolling element with the first and second races; and, in response to the temperature of the water pump falling below the specified level, axially displacing the at least one first rolling element to enable independent rotation of the first and second races.

21. The method of claim 20 wherein axially displacing the at least one first rolling element includes using a snap disc thermostat to axially displace the at least one first rolling element.

22. The method of claim 20 wherein axially displacing the at least one first rolling element includes axially displacing the first or second race.

23. The method of claim 20 wherein rotationally locking the at least one first rolling element with the first and second races includes jamming the at least one first roller element against at least one ramp disposed on the first or second race.

24. The method of claim 20 wherein in response to the temperature of the water pump rising above the specified level, axially displacing the at least one rolling element includes axially displacing the first or second race along at least one second roller element radially disposed between the first or second race and a third race, the third race arranged to attachment to an impeller for the pump, and further comprising, rotationally locking the first, second, and third races.

* * * * *